(12) United States Patent
Narukami

(10) Patent No.: US 6,222,616 B1
(45) Date of Patent: Apr. 24, 2001

(54) METHOD OF TRANSFERRING PHOTOSENSITIVE MATERIAL AND APPARATUS USED THEREFOR

(75) Inventor: Shinji Narukami, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 0 days.

(21) Appl. No.: 08/632,437
(22) PCT Filed: Sep. 18, 1995
(86) PCT No.: PCT/JP95/01860
§ 371 Date: Apr. 23, 1996
§ 102(e) Date: Apr. 23, 1996
(87) PCT Pub. No.: WO96/09568
PCT Pub. Date: Mar. 28, 1996

(30) Foreign Application Priority Data

Sep. 20, 1994 (JP) .................................... 6-224557
Sep. 21, 1994 (JP) .................................... 6-226994
Sep. 21, 1994 (JP) .................................... 6-226995

(51) Int. Cl.⁷ .................................................. G03B 27/58
(52) U.S. Cl. ................................................................ 355/72
(58) Field of Search ............................... 355/72; 226/116, 226/178

(56) References Cited

U.S. PATENT DOCUMENTS

| | | | |
|---|---|---|---|
| 4,566,784 | * 1/1986 | Nitsch | 355/72 |
| 4,903,100 | * 2/1990 | Kogane et al. | 357/27 |
| 5,041,864 | * 8/1991 | Saito et al. | 355/29 |
| 5,181,066 | * 1/1993 | Ozawa et al. | 355/29 |
| 5,230,454 | * 7/1993 | Nonaka et al. | 226/24 |
| 5,504,555 | * 4/1996 | Yamamoto | 355/29 |

FOREIGN PATENT DOCUMENTS

| | | |
|---|---|---|
| 62-249162 | * 10/1987 | (JP) . |
| 63-54140 | * 4/1988 | (JP) . |
| 64-21431 | * 1/1989 | (JP) . |
| 2-251939 | * 10/1990 | (JP) . |
| 2-311834 | * 12/1990 | (JP) . |
| 3-172833 | * 7/1991 | (JP) . |

* cited by examiner

Primary Examiner—Safet Metjahic
Assistant Examiner—John Chizmar
(74) Attorney, Agent, or Firm—Armstrong, Westerman, Hattori, McLeland & Naughton (57) ABSTRACT

A method and apparatus for transferring a strip-form photosensitive paper material comprising mounting a feed roller on an upstream side of an exposure table and a transferring roller on a downstream side of the exposure table and intermittently transferring photosensitive paper material onto the exposure table only in predetermined feed size, characterized by measuring, in advance, a feed size of the photosensitive paper material based on a number of revolutions of the feed roller and a feed size of the photosensitive paper, based on number of revolutions of the transferring roller, and compensating for the number of revolutions given to both rollers in order to prevent an error generated between the photosensitive paper feed sizes and an exposure table having upstream feed rollers and downstream transfer rollers and control means for measuring and feed the photosensitive paper material.

7 Claims, 7 Drawing Sheets

METHOD OF TRANSFERRING PHOTOSENSITIVE MATERIAL AND APPARATUS USED THEREFOR

TECHNICAL FIELD

The present invention relates to a method of transferring photosensitive material and apparatus used therefor. More particularly, the present invention relates to a method of transferring strip-form photosensitive material (hereinafter called "paper") and an apparatus used therefor which can transfer the paper in such a manner to prevent a difference between the predetermined feed size, in particular, when the paper head end portion is sent out only by feed rollers (the size is a print size corresponding to one image which is intermittently sent by a transferring device. If, for example, film has mixed images of varying print sizes, such as full size or panorama size, each adequate predetermined length of the paper, corresponding to the relevant one image, is sent out, and the feed size, when the paper head end portion is transferred after being sandwiched between transferring rollers, and with back tension between the transferring rollers and the feed rollers. The present invention also relates to a method of transferring the paper and apparatus used therefor, which can accurately form a punch hold on the paper for serving as a positioner when the photosensitive material is transferred.

BACKGROUND ART

Figure 8:
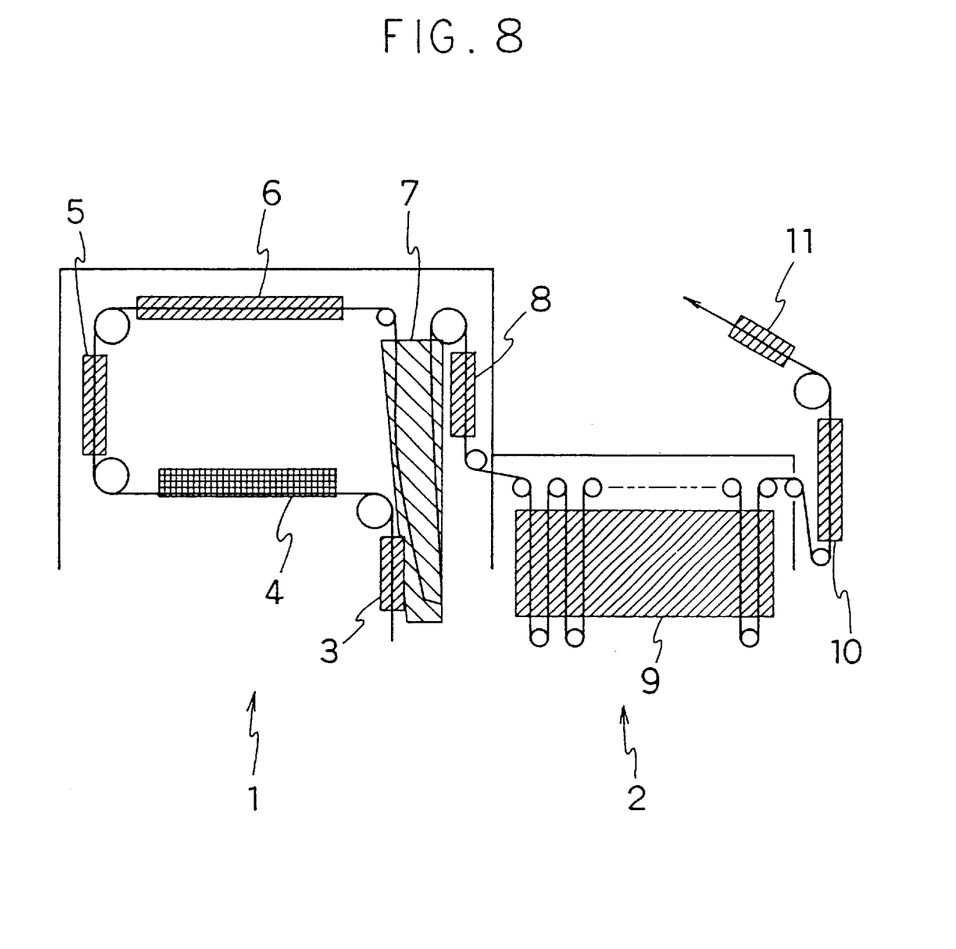
FIG. 8 is an explanatory view showing one example of construction of a photo-processing apparatus.

FIG. 8 shows one example of a photo-processing apparatus. This photo-processing apparatus comprises a printing part 1 for printing images on the paper and a processing part 2 for carrying out treatments, such as development to the printed paper.

In the printing part 1, there are equipped, along the paper transferring route, a loading part 3 for transferring the paper to the exposure table, an exposure table 4 for exposing and printing the photosensitive paper, an advance part 5 for accurately transferring a predetermined length of the photosensitive paper, a paper transferring part 6 and a stock tank part 7 which can form loops for adjusting the advance of the photosensitive paper to be sent to the processor part 2, and an outlet part 8. In the processing part 2, there are provided a processor rack part 9 in a treatment tank for carrying out color development, bleaching, and fix stabilization; a dryer part 10 in a drying tank for drying the photosensitive paper; and a cutter part 11 in the vicinity of the outlet.

Figure 1A:
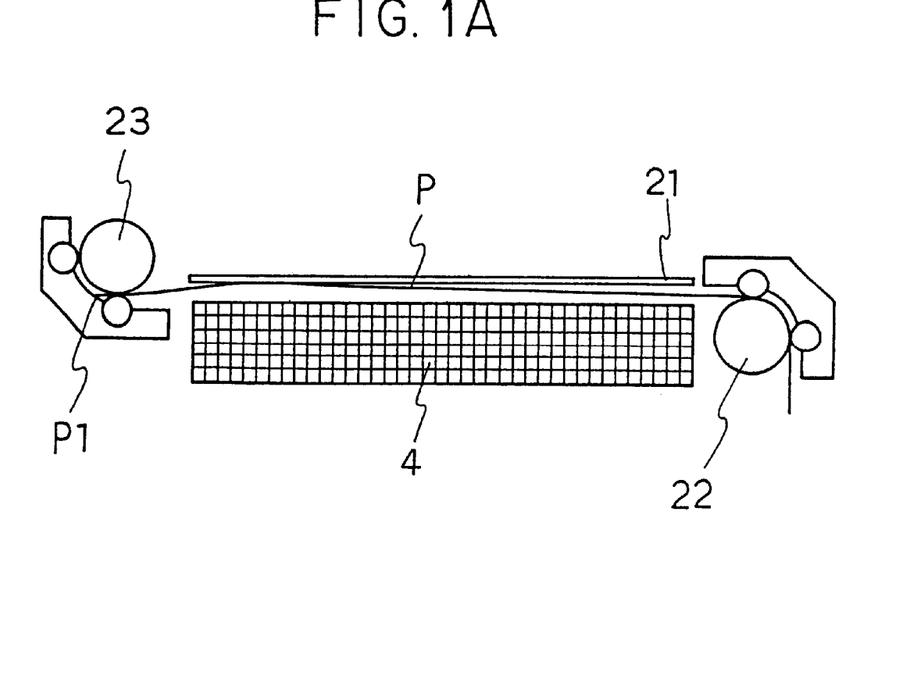
FIG. 1A and FIG. 1B are an operational explanatory view of one embodiment of a paper-transferring apparatus according to the invention.

In such photo-processing apparatus, a paper-transferring apparatus is installed for transferring the photosensitive paper, by means of a plurality of rollers, from the process of pulling out a proper amount of photosensitive paper, wrapped and held around a roll magazine (not shown), in a roll form, until the process of finishing the paper into a print, at the processing part 2 are carried out. As shown in FIG. 1A, particularly, the photosensitive paper P sent out onto the exposure stand 4 must be transferred exactly by one print size (a predetermined paper feed size) in view of the fact that an image is printed on it. Therefore, in FIGS. 1A and 1B, the feed roller 22 mounted on the upstream side of the exposure stand 4 and the transferring roller 23 on the downstream side of the transferring route of paper P are both connected to a pulse motor, and are given precisely same number of revolution so that the feed size can be controlled with back tension giving to the paper.

Figure 1B:
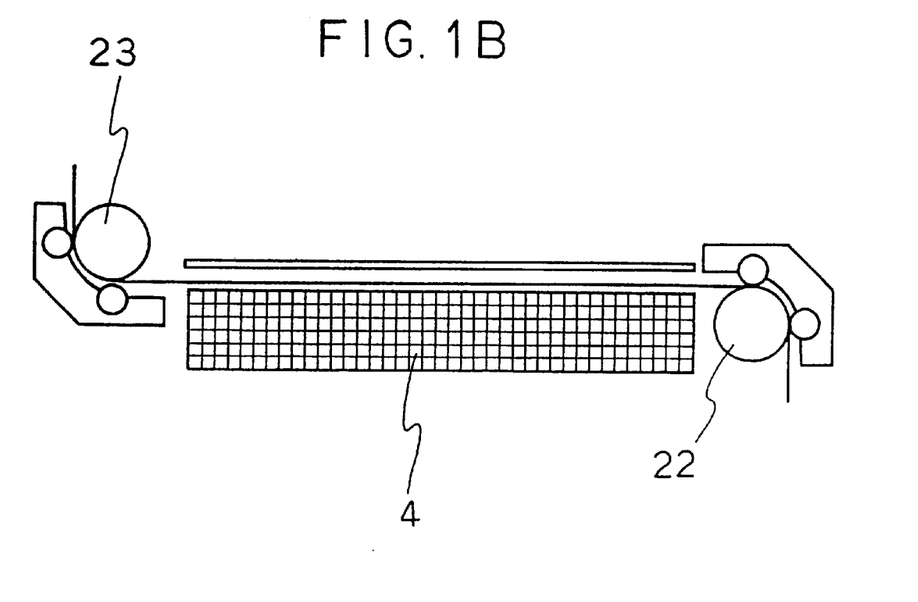

As shown in FIG. 1A, the feed size of the paper P is controlled based on the number of revolution of the feed roller 22 until the head end P1 of the paper P is sandwiched between transferring rollers 23, and as shown in FIG. 1B, the feed size, after the paper is sandwiched between transferring rollers 23, is controlled based on the number of revolution of transferring rollers 23.

Consequently, controlling the number of revolution of both rollers in the same manner gives rise to a problem that the paper is unable to be transferred exactly in the predetermined size if there is any error in the out side diameters of both rollers.

The difference of outside diameter of both rollers is caused not only by processing problems but also by the fact that the outside diameter of the feed roller 22 is intentionally made smaller than that of the transferring roller 23 in order to provide back tension to the paper after it is held between the transferring rollers. In the latter case, in particular, there are rised problems of various inconveniences such as positional discrepancy of the image in the finished print or deviation of the cut size because dimensional deviation becomes remarkable.

There is also a problem of generating waste at the paper head end portion if the paper is exposed after the head end of the paper is held between the transferring rollers.

In addition, there can be assumed a case in which the number of revolution of the feed roller and that of the transferring roller are individually set in advance to feed the predetermined size because of the difference in the outside diameter between the feed roller and the transferring roller. There is, however, a case in which the paper is sandwiched between the transferring rollers before the predetermined size is completely sent out with the feed roller only. In such case, the predetermined size is unable to be sent out unless special countermeasures are taken.

In the above-mentioned paper-transferring apparatus, in general, in order to accurately send the paper to each section stated above, punch holds are drilled near the edge between image frames of the paper, the punch holes are detected at the necessary section by a sensor, and positions of stopping and cutting are determined. Consequently, the accuracy is required for the punch hole position, and back tension is applied to the paper or the paper feed is controlled by a pulse motor to prevent variation of the punch hold position.

However, even if the paper is given back tension or feed-controlled, as described above, there is a problem of inability to improve the positional accuracy of the punch hole as required because the punch hole is drilled with the paper head end not held between the transferring rollers when the paper head end is being exposed. That is, since the paper is sent out to the punch unit by the strength of the paper only, it is difficult to push out and transfer the paper curled by the wrapping in the roll magazine, and, therefore, slack is unavoidably generated in the paper, and it is difficult to accurately arrange the punch hole position. If the paper is transferred and processed in the paper-transferring apparatus with the punch hole deviated, the deviation is generated in the image position in the finished print or defect is generated in the cut size.

Drilling punch holes with the head end held in order to eliminate variation of the punch hole position at the head end generates a great deal of portions in which no punch hole is produced, resulting in loss of the paper.

In addition, in the above-mentioned photo-processing apparatus, in general, a plurality of driving rollers are used and between respective driving rollers, a difference is generated in the roller outside diameters due to processing errors, driving motor control method differs, or roller material is different, thereby generating a difference in the feed rate of each driving roller.

While the apparatus is used over a long time, in each roller, contamination and wear gradually progress. The roller surface becomes slippery due to the contamination and the difference is also generated in the roller outside diameter due to the variation of the degree of wear, and as a result, a difference is generated in the feed rate of each driving roller.

If this error is left as it is, the paper is unable to be transferred in the predetermined sie, and paper slacks or paper pull-out between rollers occurs, causing inconvenience, such as, deteriorated print quality, deviation of cut position or printing position, or paper jamming due to defective transportation.

Consequently, in order to absorb the error of the feed rate of each driving roller, there have been a method of measuring the feed rate per one rotation of each driving roller, comparing the measured value with the theoretical value, increasing or decreasing the feed rate based on the comparison results, and compensating for the error, and a method of providing a buffer to absorb the error (for example, a method of intentionally slacking the paper and pulling it out when more than a predetermined slack volume is formed).

However, even if error is compensated for individual rollers, there is a problem that it is extremely difficult to completely synchronize all the rollers, and there is another problem that even if a buffer is provided, an apparatus for controlling the buffer is required and thus more costs or space are required.

Under the foregoing circumstances, it is an object of the present invention to provide a method of transferring a paper and apparatus used therefor which can constantly provide the predetermined feed size whichever feed roller or transferring roller with a different outside diameter is driven.

More specifically, it is another object of the present invention to provide a method of transferring the paper and apparatus used therefor which can form punch holes accurately in the paper for serving as a positioner during transferring.

Still another object of the present invention is to provide an apparatus of transferring photosensitive material which can apply proper tension to the paper so that the paper traveling condition is good, and which can absorb the error of the feed rate caused by the processing error of the roller outside diameter so that strict roller processing accuracy is not required but cost reduction can be achieved.

The paper-transferring method according to the first embodiment of the present invention comprises mounting a feed roller on an upstream side and a transferring roller on a downstream side with an exposure table located therebetween, and intermittently transferring a strip-form paper onto the exposure table only in the predetermined feed size, and characterized by measuring in advance a feed size of the paper based on number of revolution of the feed roller and a feed size of the paper based on the number of revolution of the transferring roller and compensating for the number of revolution given to both rollers in order to prevent an error generated between both paper feed sizes.

The paper-transferring apparatus according to the first embodiment of the present invention comprises a feed roller mounted on an upstream side and a transferring roller on a downstream side with an exposure table located therebetween, and a control mechanism for controlling numbers of revolution of the both rollers in order to intermittently transfer a strip-form paper onto the exposure table only by a predetermined size, and is characterized in that the control mechanism compensates for the feed size of the paper based on the number of revolution of the feed roller and the feed size of the paper based on the number of revolution of the transferring paper so as to prevent any difference from being generated between the two feed sizes.

In addition, the paper-transferring method according to the first embodiment of the present invention comprises providing a feed roller mounted on an upstream side and a transferring roller on a downstream side with an exposure table located therebetween and a control mechanism for controlling numbers of revolution of the both rollers in order to intermittently transferring a strip-form paper onto the exposure table only by a predetermined size, characterized by controlling the predetermined feed size based on the number of revolution of the feed roller until a paper head end is sandwiched between the transferring roller and controlling the predetermined feed size based on the number of revolution of the transferring roller after the paper is sandwiched between the transferring roller; and if the predetermined size of the paper is unable to be sent out by the feed roller only and is sandwiched between the transferring roller, stopping the rotation of the feed roller just before the paper is sandwiched between the transferring roller, computing the size short for the predetermined feed size by computing the feed size which the feed roller has sent, computing the number of revolution of the transferring roller corresponding to the computer value, and rotating the transferring roller only as much as the computed value.

The paper-transferring apparatus according to the first embodiment of the present invention comprises a feed roller mounted on an upstream side and a transferring roller on a downstream side with an exposure table located therebetween, and a control mechanism for controlling number of revolutions of the both rollers in order to intermittently transferring a strip-form paper onto the exposure table only by the predetermined size, and is characterized in that the control mechanism controls the predetermined feed size based on the number of revolution of the feed roller until a paper head end is sandwiched between the transferring roller and controls the predetermined feed size based on the number of revolution of the transferring roller after the paper is sandwiched between the transferring roller; and if the predetermined size of the paper is unable to be sent out by the feed roller only and is sandwiched between the transferring roller, the control mechanism stops the rotation of the feed roller just before the paper is sandwiched between the transferring roller, and computes the size short for the predetermined feed size by computing the feed size which the feed roller has sent, computes the number of revolution of the transferring roller corresponding to the computed value, and rotates the transferring roller only as much as the computer value.

The paper-transferring method according to the second embodiment of the present invention comprises sending a strip-form paper stored and held with the paper being wrapped in a roll form onto an exposure table by a feed roller and transferring the paper with the head end being sandwiched between the transferring roller, and is characterized by transferring the paper with the paper mask mounted on the exposure table being closed until a head end of the paper is sandwiched between the transferring roller.

It is preferable to keep the paper-transferring speed slower than the normal transferring speed till the paper head end is sandwiched between the transferring roller.

In addition, even if the paper mask is not held closed, it is preferable to only keep the paper-transferring speed slower than the normal transferring speed.

It is preferable to use the paper-transferring method in a paper-transferring apparatus which sends a strip-form paper onto an exposure table by a feed roller, forms punch holes with a punch unit, and transfers the paper with the head end being sandwiched between a transferring roller.

A paper-transferring apparatus according to the second embodiment of the present invention comprises an exposure table for printing and exposing the paper, a paper mask mounted on the exposure table, a feed roller disposed on an upstream side of the exposure table and a transferring roller disposed on a downstream side of the exposure table, and is characterized in that the paper mask is kept closed when a head end of the paper is sent out onto the exposure table with the feed roller until the head end is sandwiched between the transferring roller.

It is preferable to keep the paper-transferring speed slower than the normal transferring speed when the head end of the paper is sent out onto the exposure table with the feed roller until the head end is sandwiched between the transferring roller.

In addition, even if the paper mask is not held closed, it is preferable to only keep the paper-transferring speed slower than the normal transferring speed.

It is preferable to have a punch unit for forming punch holes in the paper between the exposure table and the transferring roller.

A paper-transferring apparatus according to the third embodiment of the present invention comprises a plurality of driving rollers arranged along a transferring route for transferring a strip-form paper via an exposure table, and is characterized in that the relative difference of capabilities of feed rate in the adjoining driving rollers is adjusted to be smaller for driving rollers on an upstream side than for driving rollers on a downstream side.

It is preferable to adjust relative difference of number of revolution in adjoining driving rollers to be smaller for driving rollers on an upstream side than for driving rollers on a downstream side if roller diameters of the adjoining driving rollers are nearly equal.

It is preferable to adjust relative difference of roller diameter in adjoining driving rollers to be smaller for driving rollers on an upstream side than for driving rollers on a downstream side if numbers of revolution of the adjoining driving rollers are nearly equal.

In addition, it is preferable that the adjoining driving rollers are next to each other via the exposure table.

It is also preferable that the driving roller on the upstream side of the adjoining driving rollers is formed with the material with smaller frictional resistance than that of the driving roller on the downstream side and the paper is designed to slip over the driving roller surface on the upstream side if the driving roller on the upstream side of the adjoining driving rollers is disposed so as to come in contact with a base surface of the paper.

Or, it is preferable to form the driving roller on the downstream side of the adjoining driving rollers with the material of smaller resistance than that of the driving roller on the upstream side and the paper is designed to slip over the driving roller surface on the downstream side if the driving roller on the downstream side of the adjoining driving rollers is disposed so as to come in contact with a base surface of the paper.

Furthermore, it is preferable to be constructed in such a manner that a driving roller of the driving rollers disposed so as to come in contact at least with an emulsion surface of the paper has a torque limiter which is designed to operate to cause the driving roller to slip at a driving source before the paper causes slippage on a surface of the driving roller.

In the method of transferring the paper according to the first embodiment of the present invention and the apparatus used therefor, the feed size of the paper based on the number of revolution of the feeding roller is controlled to achieve the same paper feed size based on the number of revolution of the transferring roller by measuring and compensation. Therefore, the predetermined feed size same as that after the paper is sandwiched between transferring roller can be accurately transferred when the paper is sent out only by the feed roller before the paper head end is sandwiched between the transferring roller.

Further, the numbers of revolution of the feed roller and the transferring roller are independently set in advance to send the predetermined feed size, and when the paper is sandwiched between the transferring roller before the predetermined feed size have been sent out, the number of revolution equivalent to that short for the predetermined feed size is given to the transferring roller to send the predetermined feed size.

In the method for transferring the paper and the apparatus used therefor according to the present invention, the paper is guided to a paper mask with the paper mask being closed while the paper head end is sent out onto the exposure table by the feed roller and is sandwiched between the transferring roller, thereby preventing slack of the paper on the exposure table.

By keeping the transferring speed of the feed roller slower than the normal transferring speed while the paper head end is sandwiched, the force for pressing the paper is thoroughly transmitted to the head end of the paper to prevent paper slack.

Paper slack can be prevented more accurately by sending the paper with the paper mask closed while the paper head end is sandwiched as well as by keeping the transferring speed of the feed roller slower than the normal transferring speed.

Moreover, in the paper-transferring apparatus according to the third embodiment of the present invention, if one driving roller of a plurality of driving rollers of the paper-transferring apparatus is designated to a main roller, the main roller does not slip and other driving rollers mounted on the upstream side or on the downstream side of the main roller are likely to be easier to slip than the main roller. If the feed rate of the driving roller on the upstream side of the main roller is reduced, the main roller tries to feed the paper more than the upstream driving roller, and the upstream driving roller slips. It is, therefore, able to apply tension to the paper between the main roller and the upstream driving roller. If the feed rate of the driving roller on the downstream side of the main roller is increased, the feed rate which the main roller feeds to the downstream driving roller decreases. Then, the downstream driving roller slips, and it is, therefore, able to apply tension to the paper between the main roller and the downstream driving roller.

The capability of the feed rate of each driving roller can be adjusted by providing a difference in the outside diameter of each driving roller or by providing a difference in the number of revolution of each driving roller.

It is also possible to easily cause the paper to slip on the outer circumferential surface of the roller by forming the driving roller with the material with a small frictional coefficient.

The driving roller mounted at the position in contact with the emulsion surface of the paper can be slipped without rubbing the paper surface by installing the torque limiter in such a manner that the driving roller is allowed to slip at the driving source.

BEST MODE FOR CARRYING OUT THE INVENTION

Referring now to the drawings, the paper-transferring method of the present invention and the apparatus used therefor will be described in detail hereinafter.

FIG. 1 is an operational explanatory view of one embodiment of the paper-transferring apparatus according to the invention.

In FIG. 1A, paper P is sent out onto an exposure table 4 with a paper mask 21 closed, and a head end P1 is transferred while sandwiched between the exposure table 4 and the paper mask 21. Keeping the paper mask 21 closed until the paper head end P1 reachers a transferring roller 23 can prevent paper P from being slackened.

Feed roller 22 and transferring roller 23 are driven by motors, such as, pulse motors, which can provide accurate number of revolution. For example, in the case of the pulse motor, by controlling the number of pulses given, an accurate number of revolution can be provided. Because the transferring apparatus, according to the present invention, must send, exactly by one print size intermittently onto the exposure table 4, this kind of pulse motor and the like are used.

As shown in FIG. 1A, because the paper is sent out only by the feed roller 23 until the paper head end P1 is sandwiched between the transferring roller 23, the feed size is controlled by the number of revolution of the feed roller 22. Because, after the paper head end is sandwiched between the transferring roller 23, the transferring roller 23 pulls the paper and the feed roller 22 slips to provide tension to the paper, the feed size is controlled by the number of revolution of the transferring roller 23.

The present invention is designed to correct the feed size of the feed roller 22 and the feed size of the transferring roller 23 to be constant even when the outside diameters of the feed roller 22 and the transferring roller 23 differ from each other connection is carried out by measuring the actual feed sizes of the feed roller and the transferring roller. The difference of the outside diameters include manufacturing errors in addition to planned design difference.

Figure 2:
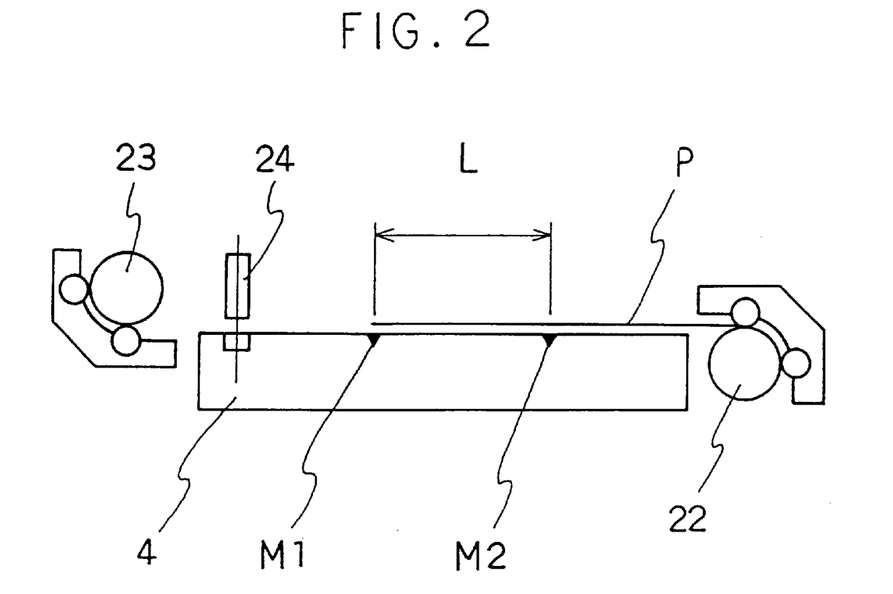
FIG. 2 and FIG. 3 are explanatory views showing a compensation method of the paper-transferring apparatus of the invention.
Figure 3:
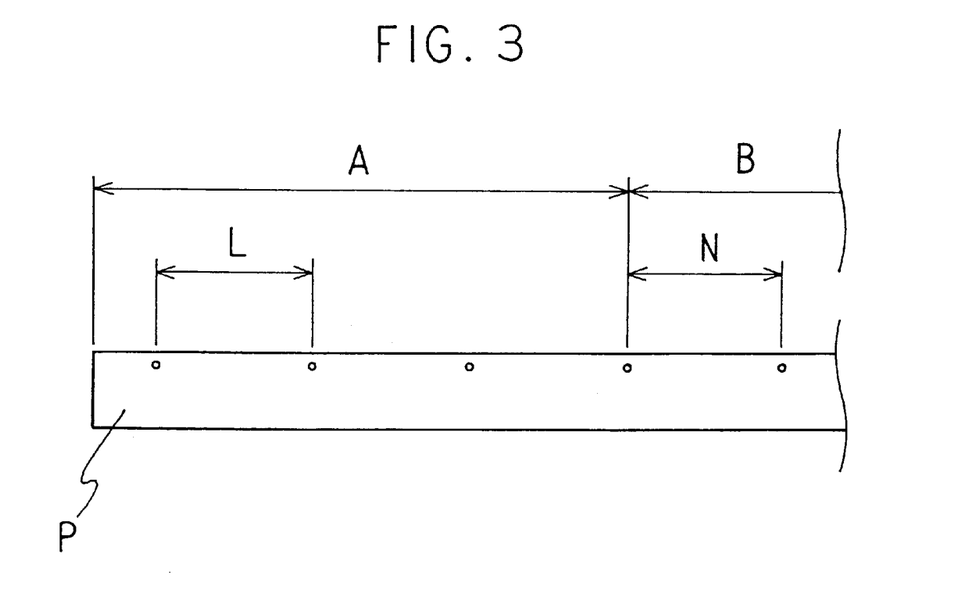

Referring now to FIGS. 2 to 3, one example of measuring and correction is described.

First of all, as shown in FIG. 2, correction of the feed size of the paper head end sent out only by the feed roller 22 to be constant is carried out by providing in advance marks M1, M2 (for example, small holes) for indicating a constant length, L, for reference on the side face, or on the upper surface of the exposure table 4 and by giving the feed roller 22 the number of revolution for sending the paper only by the length L estimated from the outside diameter of the feed roller 22. Based on whether the paper reaches the distance L as predicted, the number of revolution is increased or decreased to determine the number of revolution which can feed exactly the reference length L. If a pulse motor is used, the number of pulses is determined.

The comparison with the above-mentioned reference length L is carried out by measuring the interval of the punch holes drilled by a punch unit 24. That is, as shown in FIG. 3, the head end portion A of paper A is the portion sent out only by the feed roller 22. The number of revolution (or the number of pulses) is adjusted so that the interval of the punch holes located at this section A becomes the reference distance L.

Then, correction of the feed size, after the paper is sandwiched between the transferring roller 23 is carried out by measuring the interval of punch holes formed at section B which is not subject to the influence of the feed roller 23 as shown in FIG. 3. If this interval N is compared and is found to be smaller than the reference length L, positive correction is carried out, and if it is larger than the reference length L, negative correction is carried out.

Further, as described above, if the predetermined size is unable to be sent only by the feed roller 22 even with both corrected rollers 22, 23, that is, if the paper of one print size length is unable to be sent and is sandwiched between the transferring roller 23, the remainder size must be transferred by the transferring roller 23.

Figure 4A:
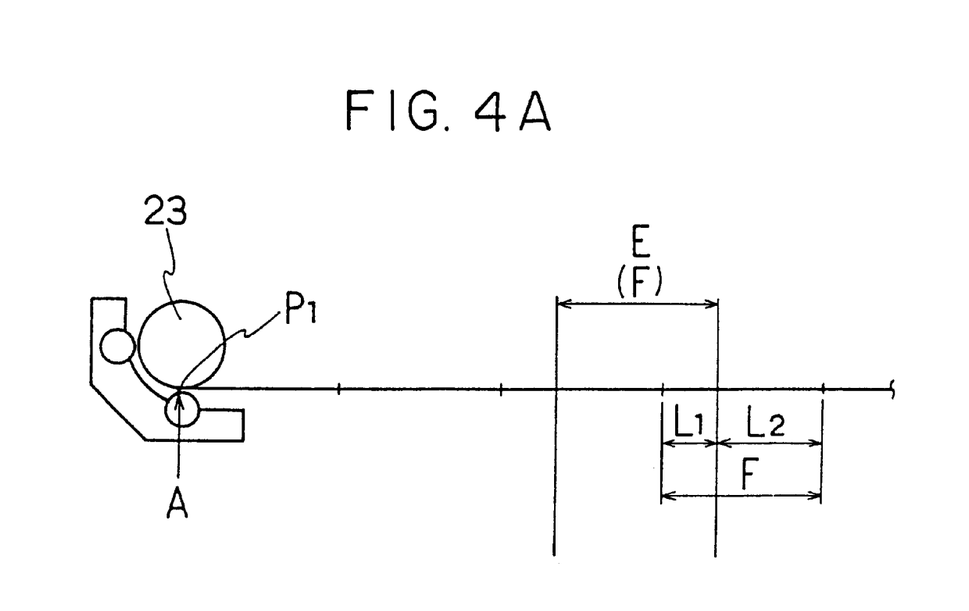
FIGS. 4A and 4B are explanatory views of another embodiment of the paper-transferring apparatus according to the invention.
Figure 4B:
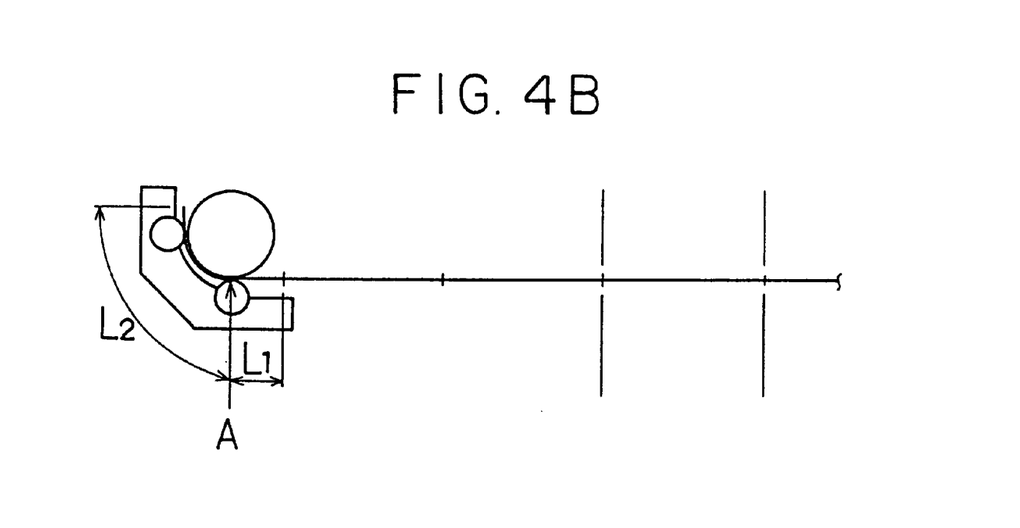

For example, if the print width to be printed in the exposure area E is F, as shown in FIG. 4A, the feed roller 22 and the transferring roller 23 must intermittently send the paper exactly as much as the print size F.

Because the paper head end P1 is sent by the feed roller 22 until it is sandwiched between the transferring roller 23 at the point A, this print size F is controlled by the number of revolution of the feed roller 22.

However, if only the size L1 is sent to the exposure area E when the paper head end P1 reaches the point C, the remainder size L2 must be sent by the transferring roller 23.

Therefore, in such event, how much the transferring roller 23 must be rotated additionally is computed as follows.

First of all, in FIG. 4A, the feed roller 22 is temporarily stopped when the paper head end P1 reaches the point A. Then, how many times the roller has been rotated to this point after the feed roller 22 finishes sending the print size of one print before is measured. This measurement is carried out by determining the number of pulses given to the motor before this point if the control mechanism uses a pulse motor, and the feed size L1 which the feed roller 22 has sent is computed from the number of revolution of the feed roller 22. The remaining size L2 is computed by the following formula. That is, $$L2 \text{ (remainder size)} = F \text{ (print size)} - L2 \text{ (feed size of the feed roller)}.$$

Then, let the size which the transferring roller 23 can feed in one rotation by S, the number of revolution of the transferring roller 23 required for sending the remaining size L2 is expressed by Number of revolution of the transferring roller 23=L2/S.

As described above, even when one print size is delivered from the feed roller 22 to the transferring roller 23 on the halfway of feeding one print size, it is possible to send exactly one print size.

Referring now to one pulse as an example, this is discussed more specifically, because the number of revolution is proportional to the number of pulses when both rollers 22, 23 are driven by a pulse motor.

For example, assume that if the paper head end P1 is sent only by the feed roller 22, giving one pulse to the feed roller 22 sends the paper 1 mm. On the other hand, after the head end P1 is sandwiched between the transferring roller 23, one pulse is given to both the transferring roller 24 and the feed roller 22, and assume that the feed rate of the paper in this event is 1.5 mm.

Now, let the print size F of the print to be printed be 100 mm and the number of pulses given to the feed roller 22 be P1 when the paper head end reaches the point A, the number of pulses P2 to be given to the transferring roller 23 is found by $$P2=(100-1\times P1)/1.5$$

Figure 5:
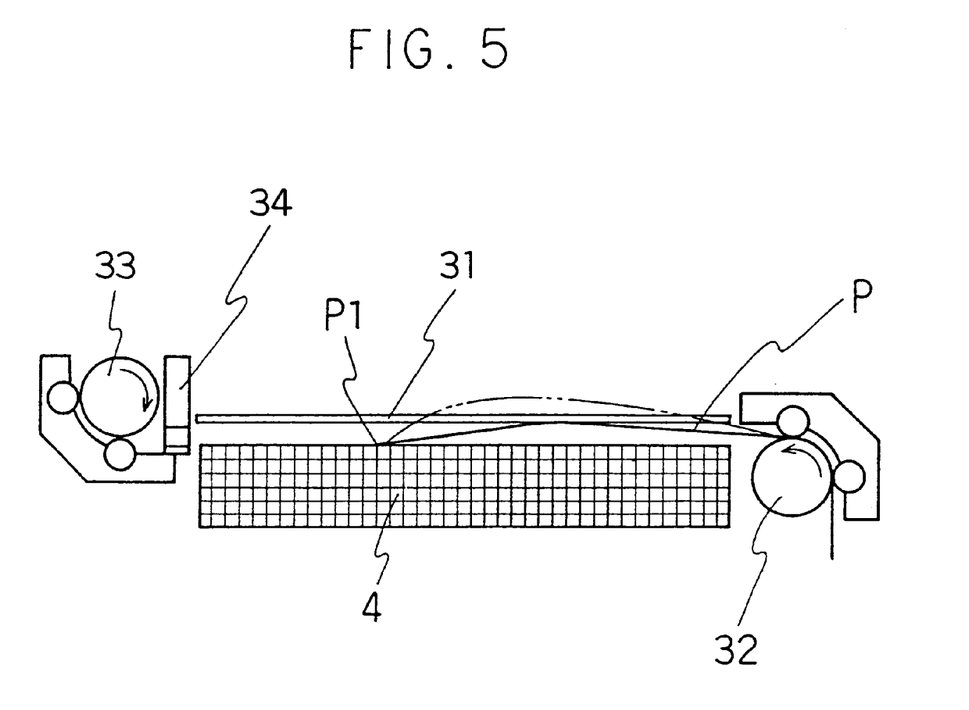
FIG. 5 is an operational explanatory view of one embodiment of the paper-transferring apparatus according to the second embodiment of the invention.
Figure 6A:
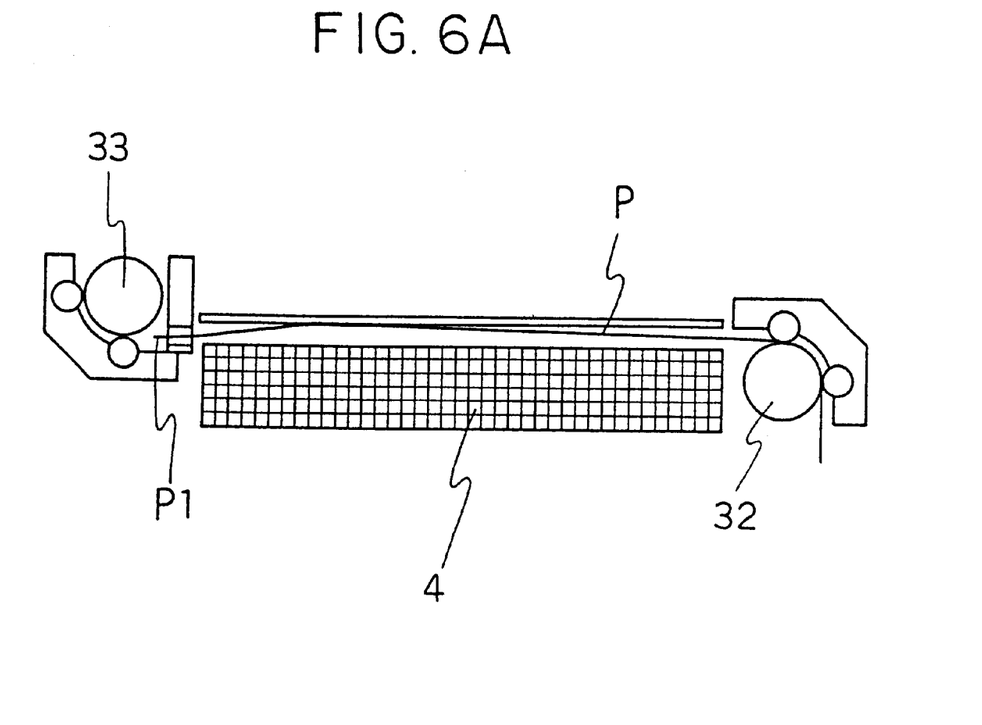
FIGS. 6A and 6B are operational explanatory views of another embodiment of the paper-transferring apparatus according to the second embodiment of the invention.
Figure 6B:
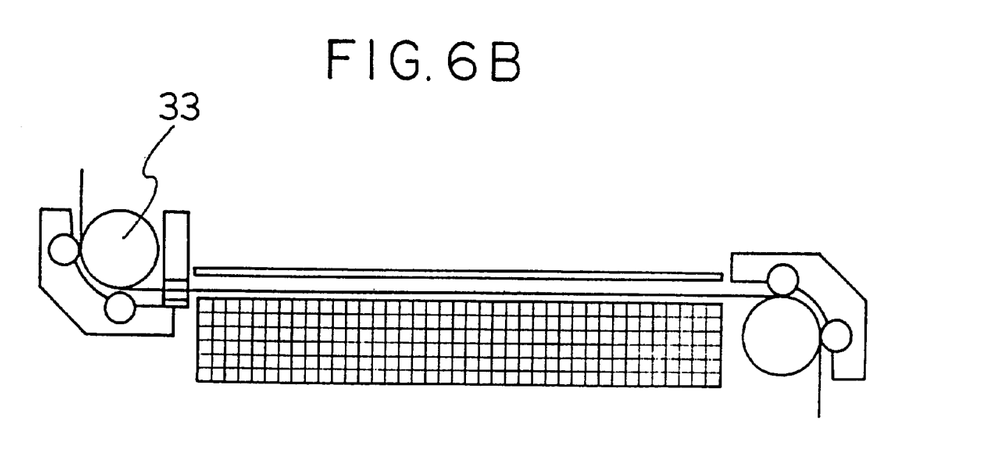

Referring now to FIGS. 5 to 6, the method of transferring paper and the apparatus used therefor according to the second invention will be explained.

In FIG. 5, the paper P is sent out onto the exposure table 4 by the feed roller 32 with the paper mask 31 being closed. If it is sent out with the paper mask 31 not being closed, the paper P slackens and bulges as shown with an alternate long and two short dashed lines. Because this bulging condition depends on the winding diameter when the paper is wound and held in a roll form in the paper magazine, the condition of paper P is not constant when its head end P1 reaches the punch unit 34, and it is unable to keep the positional accuracy of the punch hole. However, because driving the feed roller 32 with the paper mask 31 being closed allows the paper mask 31 to play a role of a guide and the paper head end P1 to reach the punch unit 34 under a stable condition, it is possible to keep the positional accuracy of the punch hole.

In the paper-transferring apparatus according to the present invention, the transferring speed of the feed roller 32 is designed to be slower than the normal transferring speed until the paper head end P1 is sandwiched between the transferring roller 33. Specifically, the transferring speed is about 20–70% of the normal transferring speed, preferably about 50%, and for example, if the normal transferring speed is 400 mm/sec, it is preferable to be about 200 mm/sec. By doing so, the paper pressing force can be transmitted far enough to the top end of the paper and the paper can be sent out comparatively straight.

The above-mentioned two methods might be implemented separately but it is preferable to be implemented together, and with this implementation, the positional accuracy of the punch hole can be further improved.

If the paper feed rate is particularly small, for example, when sending the paper head end, or when a plurality of punch holes are drilled in a short pitch (for example, 2 mm to 4 mm) to mark the paper with border or borderless, setting the motor acceleration slower than the normal acceleration can minimize the slip between the paper and the feed roller at the start-up of the motor, and the paper can be accurately positioned. Specifically, the acceleration is preferably about 40% of the normal acceleration, and for example, if the normal acceleration is 0.1716 pulses/mmsec$^2$ in a pulse motor, it is preferable to reduce it to 0.039 pulses/mmsec$^2$.

In a method for transferring paper and an apparatus used therefor according to the present invention, closing the paper mask 31, reducing the transferring speed, and making the feed rate of the feed roller and/or transferring roller controllable can achieve further effects and can eliminate the deviation of punch holes, thereby enabling cutting at high dimensional accuracy.

For example, in FIG. 6A, the paper P is sent by the feed roller 32 until the head end P1 is sandwiched between the transferring roller 33. On the contrary, in FIG. 6B, because the feed rate of the paper P is determined primarily by the number of revolution of the transferring roller 33 and back tension is given to paper P after the paper P is sandwiched between the transferring roller 33, there is a case in which the feed roller 32 is in the slipping condition.

Therefore, as shown in FIG. 3, the respective numbers of revolution are controlled so that the intervals L, N of the punch holes drilled in the paper P become same at the paper top end portion A influenced by the feed roller 32 and the portion B thereafter. The control of the number of revolution is carried out by measurement and correction.

Figure 7:
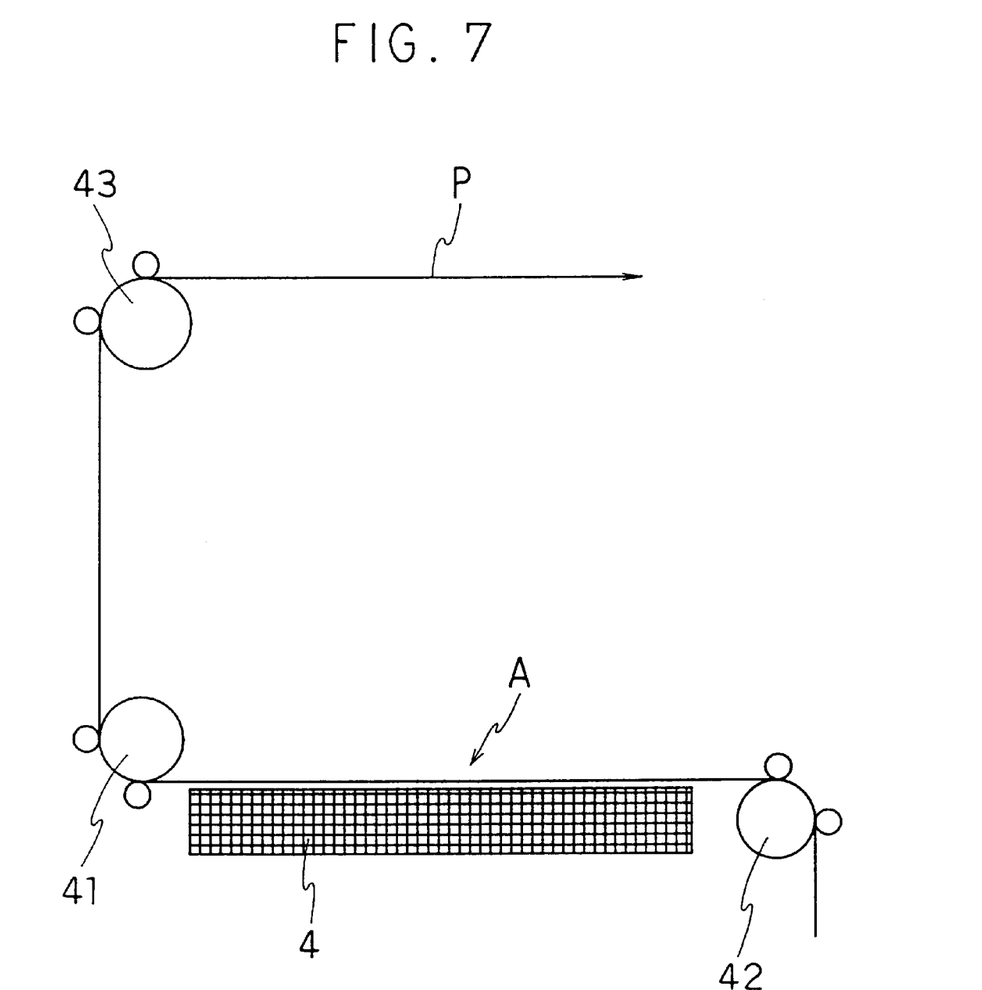
FIG. 7 is an explanatory view of the third embodiment of the paper-transferring apparatus according to the invention.

Referring now to FIG. 7, the paper-transferring apparatus according to the third embodiment will be described.

In FIG. 7, numeral 41 denotes a main roller, 42 a first roller, and 43 a second roller. The paper P is transferred from the first roller 42 to the main roller 41, and then to the second roller 43.

The present invention is characterized by adjusting the capability of the feed rate to be relatively different in adjoining driving rollers so that tension is given to the paper located between adjoining driving rollers. Consequently, the word "upstream" or "downstream" in the claim refers to the main roller 41 as the downstream side and the first roller 42 as the upstream side when the main roller 41 and the first roller 42 are compared. If the main roller 41 and the second roller 43 are compared, the main roller 41 is on the upstream side and the second roller 43 is on the downstream side. In this embodiment, in order to clarify the explanation, with the main roller 41 as a reference, explanation will be made with the first roller 42 designated as the upstream driving roller and the second roller 43 as the downstream driving roller. The first roller 42 is in contact with the base surface of the photosensitive material, while the second roller 43 and the main roller 41 are in contact with the emulsion surface of the photosensitive material.

The main roller 41 is formed with material with a large frictional coefficient, for example, rubber (urethane rubber, silicone rubber, etc.) So that the paper does not slip on its outer circumferential surface.

The first roller 42 and the second roller 43 apply tension to the paper by slipping against the main roller. Examples of slipping method include a method for slipping the paper on the roller outer circumferential surface or a method for rotating (slipping) the rollers themselves at a number of revolution different from the number of revolution transmitted by the driving source when torque, more than a specified degree, is applied.

When the roller, itself, is slipped, the first roller 42 located upstream with respect to the main roller 41 rotates (slips) at a higher number of revolution than the number of revolution of the driving source transmits and the second roller 43 on the downstream side rotates (slips) at a lower number of revolution.

Which method should be adopted shall be determined by whether the driving roller is in contact with the paper emulsion surface or with the base surface. That is, because at least the driving roller in contact with the emulsion surface must not slip on the emulsion surface, the roller itself must be designed to slip. This is because rubbing the emulsion surface causes a problem of photograph quality. However, any method might be used for the rollers in contact with the base surface.

In FIG. 7, the side facing the exposure table 4 is the base surface, and the upper side is the emulsion surface A. Consequently, the first roller 42 is a roller in contact with the base surface, and thus is formed with the material with a small frictional coefficient such as stainless steel, surface-treated aluminum (alumite-treatment), iron (plating), resin, etc. so that the paper slips on the surface. The second roller 43 is a roller in contact with the emulsion surface and thus is formed with rubber of a large frictional coefficient (urethane rubber, silicone rubber, etc.) so that the paper does not slip on the surface. For a torque limiter, a frictional type torque limiter is preferable.

The capability of the feed rate of the upstream first roller 42 is adjusted to be smaller than the feed rate of the main roller 41 and the capability of the feed rate of the downstream second roller 43 is adjusted to greater than the feed rate of the main roller 41. Examples of a method for adjusting in this way include a method for adjusting the outside diameter of the driving roller, a method for adjusting the number of revolution, etc.

For the method to adjust the outside diameter of the driving roller, for example, it is determined that the outside diameter of the main roller 41 is 100 mm, the outside diameter of the first roller 42 is 99 mm, and the outside diameter of the second roller 43 is 101 mm. Giving the same number of revolution to each of the driving rollers 41, 43, and 43 under this condition causes the upstream first roller 42 to be 99% of the feed rate of the main roller 41, pulling the paper by 1%. The downstream second roller 43 becomes 101% of the feed rate of the main roller 41, also pulling the paper by 1%. In this way, it is preferable to determine the outside diameters of the first roller 42 and the second roller 43 so as to achieve 0.2–5% slippage in view of the processing limit (dimensional variations by processing). This is because if the slippage is 0.2% or less, the paper tension is short and if it is 5% or more, the paper slips too much.

For a method of adjusting the number of revolution, there is a method of using, for example, a pulse motor, adjusting the number of pulses to be given using the acceleration or maximum speed, and decelerating the first roller 42 and accelerating the second roller 43, respectively, with respect to the main roller 41.

The main roller might be selected from either of the adjoining driving rollers or provided separately from them. When a plurality of main rollers are mounted, it is preferable to use the gear and chain so that the feed rate of each main roller becomes equal. It is also preferable to keep the diameter and the number of revolution of each main roller equal.

As described above, the method of transferring the paper and the apparatus used therefor according to the first invention is able to accurately transfer the same size as that after the paper is sandwiched between the transferring roller even when the paper head end is not yet sandwiched between the transferring roller and is sent out only by the feed roller, because the paper feed size, based on the number of revolution of the feed roller, is controlled to be the same as the paper feed size based on the number of revolution of the transferring roller. This achieves remarkable effects particularly when there is a difference in outside diameter between the feed roller and the transferring roller.

The predetermined feed size which the transferring apparatus of the first embodiment intends to intermittently send is, for example, one print size, and even when the head end of the paper is delivered from the feed roller to the transferring roller in the midst of feeding one print size, the remaining feed size is computer from the feed size of the feed roller and the remaining feed size is controlled to be sent by the transferring roller, and it is possible to constantly maintain the predetermined feed size.

Consequently, even the portion before the paper head end, which is sandwiched between the transferring roller, can be used for printing in the same manner as the portion after that which is sandwiched by the transferring roller; the loss of the portion can be eliminated and, at the same time, the positional deviation of the image in the finished print, or deviation of the cut size, can also be eliminated.

The method of transferring the paper and the apparatus used therefor according to the second embodiment can eliminate loss of the paper head end and maintain the positional accuracy of the punch hole accurately, because paper slacking and bulging on the exposure table are prevented, even if the paper head end is not sandwiched between the transferring roller by closing the paper mask and/or by controlling the transferring speed of the feed roller to be slower than the normal transferring speed until the paper head end is sent out onto the exposure table by the feed roller and is sandwiched between the transferring roller.

In addition, the paper transferring mechanism in the photo-processing apparatus, according to the third embodiment is able to constantly apply suitable tension to the paper and is able to prevent focus deviation caused by paper slacking, stopping position deviation, print quality degradation, and paper jamming at the transferring route. Because it is designed to allow the paper, or the driving roller itself, to slip and apply tension to the paper, processing errors of the outside diameter of the driving roller can be absorbed, a conventional mechanism for error correction or a buffer is no longer required, the construction becomes simple, and cost reduction can be achieved.

Using a torque limiter for the driving roller in contact with the emulsion surface to allow the driving roller to slip at the driving source and to prevent slip on the roller surface can prevent detrimental effects on the photo quality.

Industrial Applicability

The method of transferring the paper and the apparatus used therefor according to the present invention can accurately transfer the paper exactly as much as the predetermined size and are very useful, in particular, for the photo-processing apparatus equipped with a paper-transferring mechanism.

I claim:

1. A method for transferring a strip-form photosensitive paper material comprising: mounting a feed roller on an upstream side of a feed path of said material and a transfer roller on a downstream side of said feed path with an exposure table located on said path therebetween and intermittently transferring said photosensitive material onto said exposure table in a predetermined feed size length of said paper to be transferred, measuring in advance a feed size of the paper to be transferred based on number of revolution of the feed roller and a feed size of the paper to be transferred based on number of revolutions of the transferring roller and compensating for the number of revolutions to be given to each of said rollers for preventing an error in material length generated between paper feed lengths.

2. An apparatus for transferring a strip-form photosensitive paper material comprising a feed roller mounted on an upstream side of a feed path of said material and a transferrring roller on a downstream side of said feed path with an exposure table located therebetween, and a control mechanism for controlling numbers of revolution of said upstream and downstream rollers in order to intermittently transferring a strip-form paper onto said exposure table by a predetermined length of said strip form material, characterized in that said control mechanism compensates for the feed size of the strip-form material based on the number of revolutions of the feed roller and the feed size of the strip form paper material based on the number of revolutions of the transferring strip form material so as to prevent any difference from being generated between the two feed sizes.

3. A method for transferring a strip-form photosensitive material comprising providing a feed roller mounted on an upstream side and a transferring roller on a downstream side with an exposure table located therebetween and a control mechanism for controlling numbers of revolutions of said upstream and downstream transferring rollers in order to intermittently transfer strips of strip-form material onto the exposure table in a predetermined size, characterized by controlling predetermined feed size based on the number of revolution of the feed roller until a paper head end is sandwiched between the transferring roller and controlling the predetermined feed size based on the number of revolutions of the transferring roller after the paper is sandwiched between the transferring roller; and if the predetermined size of the strip forming paper material is unable to be transferred by the feed roller only and is sandwiched between the transferring rollers, stopping the rotation of the feed roller, just before the paper is sandwiched between the transferring rollers, computing the size of the strip-form material short for the predetermined feed size by computing the feed size which the feed roller has sent, computing the number of revolutions of the transferring roller corresponding to the computed value, and rotating the transferring roller only as much as the computed value.

4. An apparatus for transferring a strip-form photosensitive material along a transfer path comprising a feed roller mounted on an upstream side of said transfer path and a transferring roller on a downstream side of said transfer path with an exposure table located therebetween, and a control mechanism for controlling the number of revolutions of said rollers in order to intermittently transferring a strip-form photosensitive paper material onto the exposure table of a predetermined size, characterized in that said control mechanism controls the predetermined feed size of said strip form material based on the number of revolution of the feed roller until a paper head end is sandwiched between the transferring roller and controls the predetermined feed size based on the number of revolutions of the transferring roller after the strip-form paper material is sandwiched between the transferring roller, and if the predetermined size of the strip-form paper material is not able to be send out by the feed roller and is sandwiched between the transferring roller and the control mechanism, stops rotation of the feed roller just before the paper is sandwiched between the transferring roller, and said control mechanism computes the size for the predetermined feed size by computing the feed size which the feed roller has transferred, computes the number of revolutions of the transferring roller corresponding to the computed value, and rotates the transferring roller only as much as the computed value.

5. An apparatus for transferring a strip-form photosensitive material comprising a plurality of driving rollers arranged along a transferring path for transferring a strip-form paper via an exposure table, characterized in that the relative difference of feed rate in adjoining driving rollers is adjusted to be smaller for driving rollers on an upstream end of said path than for driving rollers on a downstream end of said path, the driving roller on the upstream side of the adjoining driving rollers is formed with a material with smaller frictional resistance than the material of the driving roller on the downstream side of the photosensitive material slips over the driving roller surface on the driving roller on the downstream side and the photosensitive material slips over the driving roller surface on the upstream side if the driving roller on the upstream side of the adjoining driving roller is disposed so as to come in contact with the base surface of the paper.

6. An apparatus for transferring a strip-form photosensitive material comprising a plurality of driving rollers arranged along a transferring path for transferring a strip-form paper via an exposure table, characterized in that the relative difference of feed rate in adjoining driving rollers is adjusted to be smaller for driving rollers on an upstream end of said path than for driving rollers on the downstream end of said path, wherein a driving roller on the downstream side of the adjoining driving rollers is formed with the material of smaller resistance than that of the driving roller on the upstream side and the photosensitive material slips over the driving roller surface on the downstream side if the driving roller on the downstream side of the adjoining driving roller contacts a base surface of said strip form paper.

7. An apparatus for transferring a strip-form photosensitive material comprising a plurality of driving rollers arranged along a transferring path for transferring a strip-form paper via an exposure table, characterized in that the relative difference of feed rate in adjoining driving rollers is adjusted to be smaller for driving rollers on an upstream end of said path than for driving rollers on the downstream end of said path, wherein a driving roller of the driving rollers, disposed so as to come into contact at least with an emulsion surface of the paper, has a torque limitor for causing the driving roller to slip as a driving source before the paper causes slippage on a surface of the driving roller.

* * * * *